(12) United States Patent
Lam et al.

(10) Patent No.: US 10,057,144 B2
(45) Date of Patent: Aug. 21, 2018

(54) REMOTE SYSTEM DATA COLLECTION AND ANALYSIS FRAMEWORK

(71) Applicant: The United States of America as represented by the Secretary of the Navy, Washington, DC (US)

(72) Inventors: Jack Lam, Rancho Cucamonga, CA (US); Matthew K Ward, Port Hueneme, CA (US); Bryan Stewart, Port Hueneme, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 155 days.

(21) Appl. No.: 15/154,928

(22) Filed: May 13, 2016

(65) Prior Publication Data

US 2017/0331709 A1    Nov. 16, 2017

(51) Int. Cl.
| | |
|---|---|
| *G06F 15/16* | (2006.01) |
| *H04L 12/26* | (2006.01) |
| *H04L 29/08* | (2006.01) |
| *H04L 12/58* | (2006.01) |
| *H04L 12/46* | (2006.01) |

(Continued)

(52) U.S. Cl.
CPC ............ *H04L 43/045* (2013.01); *F01D 17/02* (2013.01); *F16C 19/52* (2013.01); *H04L 12/4641* (2013.01); *H04L 41/0213* (2013.01); *H04L 41/22* (2013.01); *H04L 43/0823* (2013.01); *H04L 43/0876* (2013.01);
(Continued)

(58) Field of Classification Search
CPC ........... H04L 67/10; F01D 17/02; F16C 19/52

USPC ........................................................ 709/204
See application file for complete search history.

(56) References Cited

U.S. PATENT DOCUMENTS

| 6,434,512 B1 * | 8/2002 | Discenzo ............... F16C 19/52 |
| | | 702/184 |
| 6,993,421 B2 | 1/2006 | Pillar et al. |
| | | (Continued) |

OTHER PUBLICATIONS

Pickup et al. "Military Readiness: Navy Needs to Assess Risks to Its Strategy to Improve Ship Readiness", 2012, http://www.dtic.mil/dtic/tr/fulltext/u2/a564509.pdf ; 38 pgs.
(Continued)

*Primary Examiner* — Kyung H Shin
(74) *Attorney, Agent, or Firm* — Christopher A. Monsey

(57) ABSTRACT

A system for data collection and analysis is provided comprising a first network having at least one system element, at least one collection device communicably coupled to the at least one system element and configured to receive data communications from the least one system element and transmit the data. The system including a data management system communicably coupled to the collection device and configured to receive and store the transmitted data. The system further including a data analysis network communicably coupled to the first network and configured to retrieve data from the first network, the data analysis network including a management server having logic configured to at least one of analyze the retrieved data and determine remaining useful life (RUL) of at least one system element, identify a failure mode associated with the at least one system element, and determine a maintenance action sufficient to remedy a system failure corresponding to the identified failure mode.

34 Claims, 7 Drawing Sheets

(51) Int. Cl.
*H04L 12/24* (2006.01)
*F16C 19/52* (2006.01)
*F01D 17/02* (2006.01)

(52) U.S. Cl.
CPC ............ *H04L 51/04* (2013.01); *H04L 67/025* (2013.01); *H04L 67/10* (2013.01)

(56) References Cited

U.S. PATENT DOCUMENTS

| | | | |
|---|---|---|---|
| 7,580,847 B2 | 8/2009 | Black et al. | |
| 7,860,618 B2 | 12/2010 | Brandstetter et al. | |
| 7,983,809 B2 | 7/2011 | Kell et al. | |
| 8,005,467 B2 | 8/2011 | Gerlach et al. | |
| 8,106,753 B2 | 1/2012 | Vian et al. | |
| 8,201,424 B2 | 6/2012 | Bodden et al. | |
| 8,260,736 B1 | 9/2012 | Lear et al. | |
| 8,594,866 B1 | 11/2013 | Chen et al. | |
| 8,634,975 B2 | 1/2014 | Chen et al. | |
| 2008/0177436 A1 | 7/2008 | Fortson | |
| 2010/0205021 A1 | 8/2010 | Jewett et al. | |
| 2012/0029973 A1 | 2/2012 | Clements et al. | |
| 2012/0215734 A1 | 8/2012 | Mowery et al. | |
| 2012/0283963 A1* | 11/2012 | Mitchell | F01D 17/02 702/34 |
| 2014/0280593 A1* | 9/2014 | Versteyhe | H04L 67/10 709/204 |
| 2016/0062356 A1 | 3/2016 | Worden et al. | |

OTHER PUBLICATIONS

Eckstein, "Expansion of Condition-Based Maintenance Could Hit Surface Fleet Soon", ProQuest (inside the Pentagon's Inside the Navy 26.6, Feb. 11, 2013); 5 pgs.

Ackart, "An Evaluation of Markov Chain Modeling for F/A-18 Aircraft Readiness", 1998, http://www.dtic/mil/cgi-bin/GetTRDoc?AD=ADA355T61; 57 pgs.

* cited by examiner

REMOTE SYSTEM DATA COLLECTION AND ANALYSIS FRAMEWORK

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 103,369) is assigned to the United States Government and is available for licensing for commercial purposes. Licensing and technical inquiries may be directed to the Office of Research and Technology Applications, Naval Surface Warfare Center Port Hueneme; telephone number: (805) 228-8485.

BACKGROUND AND SUMMARY OF THE INVENTION

The data collection and data analysis components of information/computing system readiness assessment are often discussed but never fully understood. Many issues have been identified, but no single mapping of the solutions has been developed to ensure all capability gaps are addressed adequately and their progresses are tracked vigorously. A number of efforts have been pursued in the past but the returns on investment often did not justify the initial costs. The lack of clarity in the data collection and data analysis process poses a multitude of problems; therefore, a framework must be addressed to help government and corporate activities understand the capability gaps in the overall collection and analysis process as well as its impact to the product life cycle cost. This strategy will ensure proper review of state-of-the-art technologies and further innovations can be incorporated to improve our assessment capability for information/computing system readiness and supportability need. An improved framework provides a way forward to closing the current capability gap that can significantly impact our ability to measure and improve system readiness and lifecycle sustainment. For example, in terms of government entities, the Navy has a series of strategic objectives which involve improving fleet readiness, advancing new capabilities to the fleet, and improving total ownership cost of naval combat systems. In order to meet these strategic objectives, one should first examine the current data collection and analysis process to determine where capability gaps and new technologies could be implemented before finalizing a comprehensive layout that will be used to support the strategic objectives.

Today the data collection and analysis process is manual and tedious. In the context of the Naval information systems, each system has its own method of collecting data, and synchronizing disparate systems both on ship and on shore is difficult. Large scale continuous data collection is rare due to its impacts to sailor/technician operation and bandwidth constraint of particular computing network. Some legacy systems lack the built-in-tests and prognostics requirements so implementation for health monitoring is difficult. Another challenge with data analysis is the ability to relate various data sets into productive recommendations for future system improvements and device maintenance. While a lot of data has been slowly gathered throughout the years, there have not been adequate studies to evaluate the correlation between the different data types. The outcome is that a majority of the recommendations are still greatly influenced by the interest and experience of the subject matter expert, without sufficient quantitative data to support or legitimize the result. Further, most data collection and data analysis capabilities do not integrate directly to the operations support team and its remote support capability, delaying fleet support responses that could otherwise mitigate impending issues effectively.

Lastly, today's model for supporting local or remote systems lacks the dynamics of supporting a force level integration, specific mission, unique technological objectives. One example, of force level integration involves merging data analysis across a multitude of deployed/remote systems and joint assets to formulate a robust response sequence that adequately responds to challenges posed by adversaries or competitors. There is also no objective based modeling tailored to measure fleet/system readiness and capabilities where systems may be under adverse conditions with emergent part failures and delay in logistics support. The result of these gaps prevents remote maintenance centers from visualizing a more refined picture of the system status/remaining life and measuring the system's ability to accomplish the ongoing technical objective. The dynamics of the force level integration and the underlying data are also not designed to integrate into future system design and system life cycle management, thus generating a process gap in how operation and sustainment should quantitatively influence new system development. Accordingly, an improved data collection and analysis framework is needed to adequately address the various aforementioned challenges.

In one embodiment of the present disclosure a system for data collection and analysis is provided, comprising a first network having a first plurality of system elements and a second plurality of system elements; a first collection device communicably coupled to the first plurality of system elements and configured to receive data communications from each of the first plurality of system elements and transmit the data by way of a first network protocol; a second collection device communicably coupled to the second plurality of system elements and configured to receive data communications from each of the second plurality of system elements and transmit the data by way of the first network protocol; a data management system communicably coupled to the first and second collection devices and configured to receive the data transmitted by the first and second collection devices and store the data in a download directory disposed within the data management system; a second network communicably coupled to the first network, the second network having a support server providing secure data communications to an external network and a secure transfer system that receives data from the external network and monitors data communications transmitted from the first network to the second network and from the second network to the external network; a communication network communicably coupled to the second network and providing a communications link between the second network and the external network, the communication network including one or more computing programs accessible by a user in the external network; and a data analysis network communicably coupled to the second network by way of the communication network, wherein the data analysis network is the external network and is configured to retrieve data from the second network through the communication network; wherein the data analysis network includes a management server that stores the retrieved data, the management server including logic configured to at least one of analyze the retrieved data and determine remaining useful life (RUL) of at least one system element, identify a failure mode associated with the at least one system element, and determine a maintenance action sufficient to remedy a system failure corresponding to the identified failure mode.

In another embodiment of the present disclosure a system for data collection and analysis is provided, comprising an operations maintenance network having a first plurality of system elements and a second plurality of system elements; a data management system disposed in the operations maintenance network and communicably coupled to the first and second plurality of system elements and at least one collection device, the data management system being configured to receive data communications from each of the first plurality of system elements and each of the second plurality of system elements, wherein the data communications are received by way of the at least one collection device; a communication network communicably coupled to the operations maintenance network and providing a communications link between the operations maintenance network and an external network, the communication network including one or more computing programs accessible by a user in the external network.

The system further includes a support server disposed in the operations maintenance network and communicably coupled to the data management system, the support server providing secure data communications to the external network; a secure transfer system disposed in the operations maintenance network and communicably coupled to the support server; the secure transfer system being configured to receive data from the external network and to monitor data communications transmitted from the operations maintenance network to the external network; and a data analysis network communicably coupled to the operations maintenance network by way of the communication network, wherein the data analysis network is the external network and is configured to retrieve data from the operations maintenance network through the communication network; wherein the data analysis network includes a management server that stores the retrieved data and logic configured to at least one of analyze the retrieved data and determine remaining useful life (RUL) of at least one system element, identify a failure mode associated with the at least one system element, and determine a maintenance action sufficient to remedy a system failure corresponding to the identified failure mode.

In yet another embodiment of the present disclosure a method in a system for data collection and analysis is provided, comprising collecting, by at least one collection device, data from at least one system element of a plurality of system elements, the collection device and the plurality of system elements each being disposed in a first network; detecting, by a fault detection logic, one or more fault conditions associated with at least one system element of the plurality of system elements, the fault detection logic being associated with at least one computing circuit of the at least one system element; receiving, by a data management system, the data collected by the at least one collection device, wherein the data is received by way of a first network protocol, is stored in a download directory disposed within the data management system, and indicates one or more fault conditions associated with the at least one system element; displaying, by a graphical user interface, one or more fault conditions associated with at least one system element, the one or more fault conditions being displayed based on the application of logic associated with a computing circuit of the data management system, the logic including one or more fault detection protocols and one or more fault isolation protocols that cooperate to isolate a fault condition to a particular system element.

The method further includes, providing, by a communication network, a data link between the first network and a second network, the communication network including one or more computing programs accessible by a user in the external network and wherein the data link provides secure data communications between the first and second networks; analyzing, by a management server disposed in the second network, data retrieved from the first network through the communication network, wherein the management server stores the retrieved data and applies logic to analyze the retrieved data; and, wherein analyzing includes at least one of determining a remaining useful life (RUL) of at least one system element, identifying a failure mode indicated by a fault code associated with the at least one system element, and determining a maintenance action sufficient to remedy a system failure corresponding to the identified failure mode.

In yet another embodiment of the present disclosure a system for data collection and analysis is provided, comprising a first network having a first plurality of system elements and a second plurality of system elements; a first collection device communicably coupled to the first plurality of system elements and configured to receive data communications from each of the first plurality of system elements and transmit the data by way of a first network protocol; a second collection device communicably coupled to the second plurality of system elements and configured to receive data communications from each of the second plurality of system elements and transmit the data by way of a second network protocol. The system further includes a data management system communicably coupled to the first and second collection devices and configured to receive the data transmitted by the first and second collection devices and store the data in a download directory disposed within the data management system; a second network communicably coupled to the first network, the second network having a support server providing secure data communications to an external network and a secure transfer system that receives data from the external network and monitors data communications transmitted from the first network to the second network and from the second network to the external network; and a communication network communicably coupled to the second network and providing a communications link between the second network and the external network, the communication network including one or more computing programs accessible by a user in the external network.

The support server stores the retrieved data and includes logic configured to at least one of: analyze the retrieved data, determine remaining useful life (RUL), determine a performance degradation pattern of at least one system element, identify a failure mode associated with the at least one system element, evaluate a plurality of impacts of the failure mode to a plurality of objectives of the first plurality of system elements and second plurality of system elements, and determine a maintenance action sufficient to remedy a system failure corresponding to the identified failure mode. The system further includes a data analysis network communicably coupled to the second network by way of the communication network, wherein the data analysis network is the external network and is configured to retrieve data from the second network through the communication network; wherein the data analysis network includes a management server having logic configured to at least one of: store data generated from the first network, the second network, and the communication network, and to service a data portal for a plurality of users to enable at least one user of the plurality of users to gain access to the data generated from the first network, the second network, and the communication network.

The data analysis network further includes an integrated data environment having logic configured to at least one of: load a plurality of data generated from the first, second, and communication networks into a database used to manage a plurality of structured data sets and a plurality of unstructured data sets, retrieve a plurality of external data from a plurality of external data sources, analyze the retrieved data, determine remaining useful life (RUL) and performance degradation pattern of at least one system element, identify a failure mode associated with the at least one system element, evaluate a plurality of impacts of the failure mode to a plurality of objectives of the first plurality of system elements and the second plurality of system elements, determine a maintenance action sufficient to remedy a system failure corresponding to the identified failure mode, correlate the plurality of data generated from the first, second, and communication network, process a plurality of text-based data using natural language processing, and generate machine readable instructions to modify an operational state of a plurality of systems disposed within the first network and the second network.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments disclosed herein are not intended to be exhaustive or to limit the disclosure to the precise forms disclosed in the following detailed description. Rather, the embodiments were chosen and described so that others skilled in the art may utilize their teachings. The following description is merely exemplary in nature and is in no way intended to limit the various application or uses of the disclosure. As used herein, the phrase at least one of A, B, and C should be construed to mean a logical (A or B or C), using a non-exclusive logical OR. It should be understood that steps within a method may be executed in a different order without altering the principles of the present disclosure. As used herein, the term controller, computing device, or computing system, may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
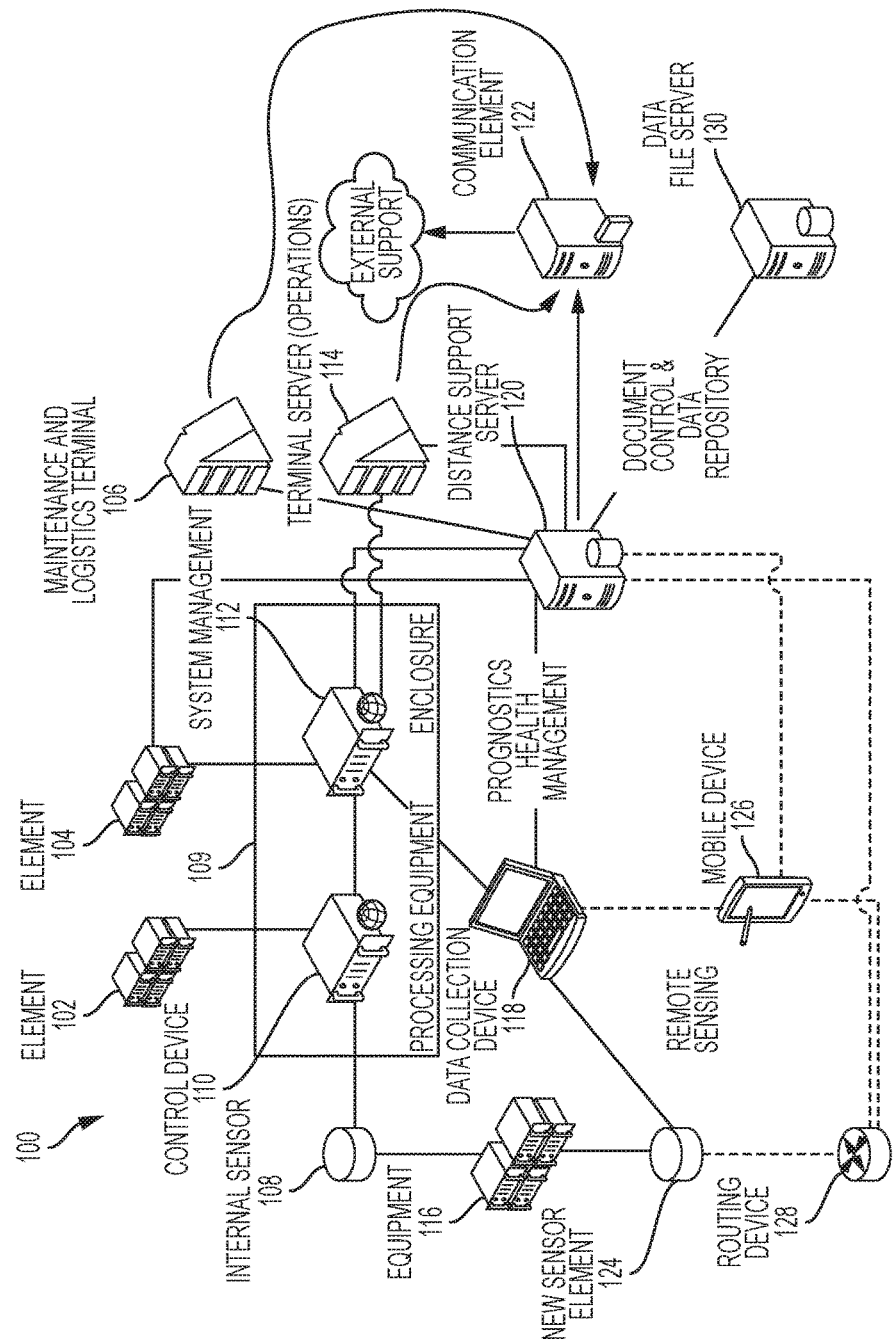
FIG. 1 is an exemplary block diagram depicting a first computing network according to an embodiment of the present disclosure.

Referring initially to FIG. 1, an exemplary block diagram depicting a first computing network 100 according to an embodiment of the present disclosure is shown. First computing network 100 (hereinafter "network 100") generally includes a first element 102, a second element 104, a terminal 106, an internal sensor 108, and a priority enclosure device 109. Priority enclosure device 109 generally includes a control device 110 and a system manager 112. Network 100 further includes computing racks 116, collection device 118, sensor element 124, routing device 128 and mobile device 126. Network 100 may further include an remote access server 114, a support sever 120, a communication network element 122 and a data/file server 130. The one or more devices, components and/or computing resources of network 100 generally cooperate to form one or more sub-networks.

In the illustrative embodiment of FIG. 1, network 100 includes a prognostic health management sub-network formed in-part by enclosure device 109 being communicably coupled to first element 102, second element 104, internal sensor 108, support server 120, remote access server 114, and collection device 118. Network 100 further includes a remote sensing sub-network comprising collection device 118 being communicably coupled to both sensor element 124 and mobile device 126, and further comprising routing device 128 being communicably coupled to sensor element 124, mobile device 126 and support server 120. Network 100 further includes a document control and data repository sub-network comprised of support server 120 providing a central data hub that engages in data communications through communications coupling with terminal 106, remote access server 114, command systems 122 and data/file server 130. Network 100 generally includes a plurality of networked devices configured to communicate with one another by way of the IEEE 802.15.4 communication standard/protocol that specifies the physical layer and media access control for lower-transfer-rate personal area networks, the IEEE 802.11 communication standard/protocol that specifies the physical layer and media access control for wide area networks, and/or the Bluetooth communication standard/protocol that specifies the physical layer and media access control for exchanging data over short distance. Moreover, in the present disclosure, there are a variety of network protocols available to transfer sensor data from equipment to various system management modules. These network protocols include, but are not limited to: Secure Hyper Text Transfer Protocol (HTTPS), Simple Network Management Protocol (SNMP), or Secure File Transfer Protocol (SFTP).

In one embodiment of the present disclosure, network 100 is a network domain used to move data between large scale computing systems such as computing systems existing in a data processing center or a mission-based operational center.

For example, in the private sector, network 100 may be implemented within a cruise ship or offshore drilling platform. In this example, network 100 provides a network domain that can represent navigation systems and/or weather radar systems implemented within the cruise ships or drilling platforms. Moreover, in this exemplary domain, network 100 may be identified/described as a network in which maintenance type data is collected, stored and analyzed to discern current and prospective system failures as well as provide corrective actions to address these failures. Likewise, in the public sector, network 100 may be implemented within naval, space, coast guard or law enforcements vessels as well as deployed and/or land-based operational centers supporting homeland defense, law enforcement operations, remote sensing and communication, or field research.

As shown in the illustrative embodiment of FIG. 1, internal sensor 108 is communicably coupled to computing racks 116 and control device 110 of enclosure 109. In one embodiment, sensor 108 is disposed adjacent at least one rack of computing racks 116 and is configured to provide sensor data to control device 110. In this embodiment, sensors 108 are also disposed on circuit boards that form elements 102, 104 and include logic used to collect one or more parameters that indicate one or more performance characteristics of element 102, 104. In one aspect of this embodiment, sensor 108 is configured to provide sensor data indicating one of a temperature, fan speed, processor speed, memory capacity, and voltage power values and/or data communications corresponding to performance parameters of at least one rack of computing racks 116. Sensor 108 and sensor element 124 cooperate and interconnect with other components of network 100 to provide a sensor and data collection mechanism including a capability that can be used for performance assessment and conditional based assessment based on unique sensor placement and system operational condition. The mechanism includes establishment of the data collection capability to directly receive sensor data and transfer that data into a data processing system such as support server 120 and/or into a storage system such as data/file server 130.

Control device 110 and system manager 112 of enclosure 109 cooperate with support server 120 to provide high processing computing systems of network 100 utilized to process on board sensor data (from sensor 108 and 124) for prognostics health management and/or other diagnostics capability within network 100. The data repository sub-network of network 100 holds information collected by device 109 in a structured format for data transfer to be used in modeling and system capability assessment. The prognostics health management functions of network 100 include performance monitoring capability of various network system elements (102 and 104) and computing racks (116). This functionality includes the ability to predict impending system or devices failure through a prognostics methodology that includes looking at system degrading trends and reliability metrics. In one embodiment, the trends and metrics may be forwarded to an external network for data processing and/or detailed root cause analysis and prescription of corrective actions.

In another embodiment of the present disclosure, support server 120 receives the aforementioned system degrading trends and reliability metrics (i.e., system performance data) and functions as a central data hub that processes the received performance data into remaining useful life and other prognostics health management information and provides the information to terminal 106, remote access server 114, communication network elements 122 and data/file server 130. In this embodiment, terminal 106 is configured to allow detailed coordination of operations and activities to obtain supplies and/or replacement devices necessary to mitigate or correct a degraded component or device used within network 100. In this embodiment, remote access server 114 is configured to allow remote user or support team to gain access into network 100 and provide data analysis and operational control remotely by reviewing the processed prognostics information and metrics in support server 120 and providing manual control over system management 112 and control device 110. As shown in the illustrative embodiment of FIG. 1, network 100 includes data transfer functionality in which system performance data may be collected and transferred to an exemplary external network for data processing and analysis. The data transfer capability of network 100 includes exploring both available data transfer bandwidth and the one or more applications used to exercise/accomplish the transfer. The data transfer capability may further include other functions such as data/network security and network administration. In one embodiment, terminal 106 is a logistics terminal such as an electronic/computing hardware device used for entering/receiving data. Also in this embodiment, communication network elements 122 serves as the communication nodes between network 100 and external network 200 to provide two-way network access and authentication between the two networks. Communication network elements 122 also provide network capability to allow network 100 to communicate with other networks related to network 100, such as a network managing auxiliary equipment comprising of power and cooling plants or a network supporting the terminal 106 by relaying logistics and maintenance information to a centralized logistics and maintenance planning system that support network 100. These networks may be collocated with the network 100 on a vessel, a ground-based structure, or within a generalized location. (i.e. an island, an oil platform) Communication network elements 122 may link communication through a satellite or a ground network.

In another embodiment of the present disclosure, a remote routing device 128 receives sensor data from sensor element 124 that collects data related to the equipment 116. The sensor element 124 may represent a wireless-enabled device attached to the equipment 116, a network-enabled device measuring environment factors such as temperature or humidity in proximity with the equipment 116, a sensor element connected to the collection device 118 that can detect various measurements, or wireless-enabled wearable such as a fabric wore by a user that can provide environmental data to the network 100. The mobile device 126 may represent a hand-held electronic device, a wearable device such as a head-mounted device, or a plurality of related devices that are generally used to capture visual images, display information, and communicate with remote support team directly from a user view point.

Figure 2:
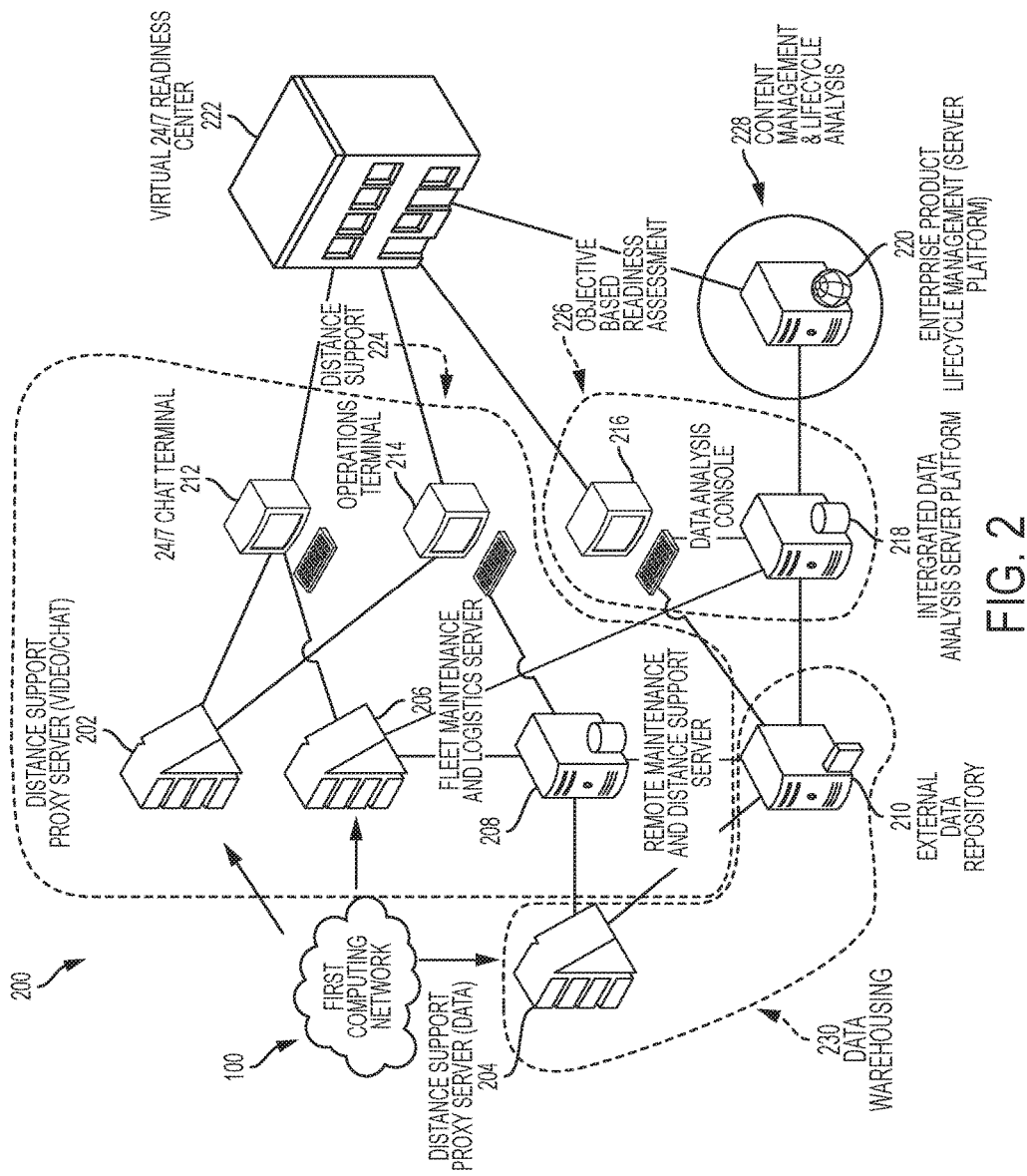
FIG. 2 is an exemplary block diagram depicting a second computing network that engages in data communications with the computing network of FIG. 1 according to an embodiment of the present disclosure.

FIG. 2 is an exemplary block diagram depicting a second computing network 200 that engages in data communications with the computing network of FIG. 1 according to an embodiment of the present disclosure. Second computing network 200 (hereinafter "network 200") generally includes a first support server 202, a second support server 204, a maintenance and logistics support server 206, a remote access server 208 and a data repository 210, a chat terminal 212, an operations terminal 214, a data analysis terminal 216, an integrated data analysis server platform 218, and a lifecycle management server platform 220. The one or more devices, components and/or computing resources of network 200 generally cooperate to form one or more sub-networks and can be accessed through a virtual portal 222. In the illustrative embodiment of FIG. 2, network 200 includes a distance support sub-network 224 formed in-part by the first support server 202, the maintenance and logistics support server 206, the remote access server 208, the chat terminal 212 and the operations terminal 214. Network 200 further includes an objective based readiness assessment sub-network 226 comprising the data analysis console 216 and the integrated data analysis server platform 218. Network 200 also includes a content management and lifecycle analysis sub-network 228 comprising the lifecycle management server platform 220 being communicably coupled to the integrated data analysis server platform 218.

In the illustrative embodiment of FIG. 2, support proxy server 204 and data repository 210 interconnect to form an external data repository sub-network that provides exemplary data warehousing capability of network 200. The warehousing capabilities include housing data received from network 100, passing data to remote access server 208 for a remote operator to analyze the aggregated data, as well as passing data to integrated data analysis server platform 218 to assess the relationship within network 100 data. Network 200 therefore enables a shore-side/remote distance support center to conduct analysis that assesses system performances and supportability requirements represented by network 100 and provide a means to interact with a user in proximity with network 100 through chat terminal 212 or directly remotely accessing system elements within network 100 through the operations terminal 214. Additionally, information received by network 200 may also be used for mission/objective-based modeling and readiness assessment of systems and devices utilized within network 100 by connecting the data analysis terminal 216 and modeling the system data against the system objectives as defined in the lifecycle management server platform 220. The modeling and readiness assessment may include various methodologies including, for example, probability of mission success and system availability, simulation of mission environment and supportability perimeter to provide a realistic assessment of ship or data center capability. In one embodiment, network 200 further includes system product lifecycle analysis capability that involves studying the impact of readiness assessment with the lifecycle cost and examines the tools used for product lifecycle management as well as the methodology used to measure the relationship on performance to availability and cost by connecting to content management and lifecycle analysis sub-network 228 where system configurations are managed. Network 200 also includes maintenance and logistics evaluation by connecting maintenance and logistics support server 206 with the integrated data analysis server platform 218 to update failure model and optimize a logistics footprint.

In one embodiment of the present disclosure, much like network 100, network 200 is also network domain used to move data between large scale computing systems such as computing systems existing in a data processing center or a mission-based network maintenance center. For example, in the public and/or private sector, network 200 may be implemented within a data center that is external to and spaced apart from an exemplary cruise ship/law enforcement/military vessel computing network or computing network of an offshore drilling platform. In this example, network 200 provides a network domain that analyzes trends and metrics associated with detected and/or predicted system failures occurring within the cruise ships or drilling platforms. Moreover, in this exemplary domain, network 200 may also be identified/described as a network in which maintenance type data is collected, stored and analyzed to discern current and prospective system failures as well as provide corrective actions to address these failures. In another embodiment, network 200 can connect to more than one network 100 where multiple vessels or remote locations will provide data to the data repository 210 for fleet-wide or enterprise-level data analysis that allows to assess organization strategic objectives Yet another embodiment allows network 200 to be hosted in a public/private cloud-service platform instead of host organization facilities to enable network 200 to be interfaced virtually from any location where internet is accessible and to extend data availability for other organization functions such as development and testing.

Figure 3:
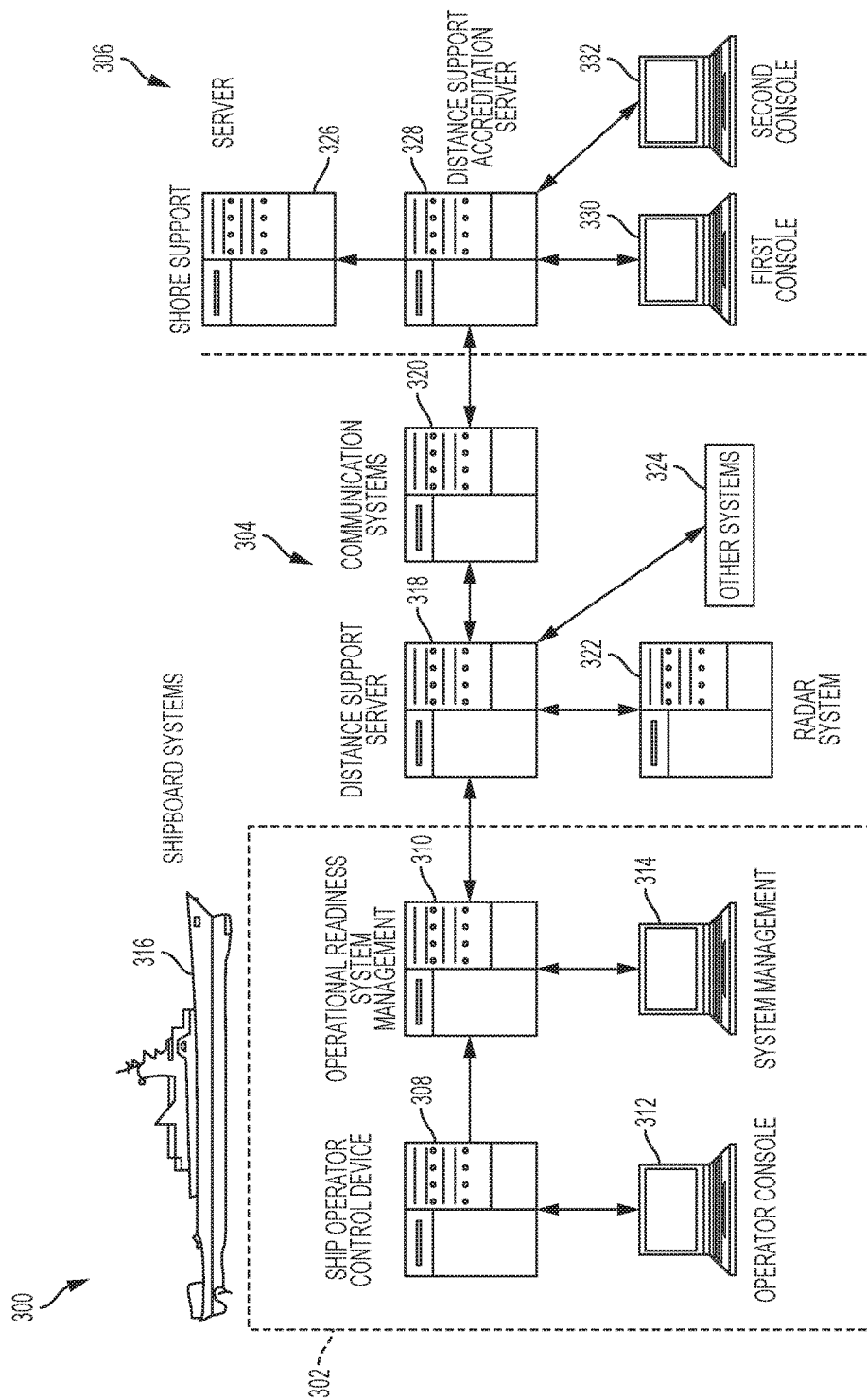
FIG. 3 is a block diagram depicting an exemplary network architecture that extends between the first and second computing networks of FIG. 1 and FIG. 2 respectively, according to an embodiment of the present disclosure.

FIG. 3 is a block diagram depicting an exemplary network architecture 300 that extends between network 100 and network 200, according to an embodiment of the present disclosure. As discussed briefly above, in one embodiment of the present disclosure, network 100 may be disposed on a ship or vessel owned and operated by a commercial, law enforcement, or defense entity. As such, in the illustrative embodiment of FIG. 3, network architecture 300 (hereinafter "network 300") generally includes a ship 316 having a shipboard system 302 generally comprising control device 308 with console 312 communicably coupled thereto and system management system 310 with console 314 communicably coupled thereto. Shipboard system 302 generally includes functionality substantially related to the functionality provided by one or more of above described components of network 100. In one embodiment, control device 308 receives sensor data indicating system health, detected fault codes, and performance parameters associated with one or more system elements of network 100 such as element 102, 104. In this embodiment, consoles 312, 314 each include a graphical user interface (GUI). Users residing at console 312, 314 are able to view data communications on the GUI which indicate, for example, the occurrence of a system fault or fault code associated with a particular system element. In one aspect of this embodiment, the system fault or fault code is based on data provided by sensor 108 and system 310 may use this fault data to test the operational readiness of particular system elements within network 100.

Network 300 further includes distance support sub-network 304 generally comprising a plurality of interconnected components such as a support server 318, a communication system 320, a radar system 322, and other on-ship systems 324. Support sub-network 304 is configured to engage in data communications with shipboard system 302. In one embodiment, system 310 provides sensor data and embedded diagnostics to support server 318 for compiling and formatting prior to data transfer from support sub-network 304 to an exemplary external network (described in more detail below). Likewise communication system 320, radar system 322 and other on-ship systems 324 may also engage in data communications with support server 318 wherein each system provides sensor data indicating, for example, system status, health and/or performance parameters. In one aspect of this embodiment, systems 320, 322, 324 may each include one or more sensors configured to provide data indicating the occurrence of or potential occurrence of system faults or fault codes. Also, in one aspect of this embodiment, support server 318 may correlate sensor data and health parameters between systems 302, 320, 322, 324 to provide a comprehensive status of the ship 316 and can be interacted by the user residing at console 312, 314 and similar console belonging to system 320, 322, 324. The sensor data from systems 302, 320, 322, 324 and the data analytics computed at support server 318 will then pass to communication system 320 for transfer to shore support network 306.

Network 300 further includes shore support network 306 generally comprising a plurality of interconnected components such as a shore support system 326, a support accreditation server 328, a first console 330 and a second console 332. In one embodiment, shore support network 306 is configured to engage in data communications with support sub-network 304 to generally manage the overall readiness status of systems and components used within systems 302 and sub-network 304. As described in more detail herein below, a plurality of shore support system 326 may comprise logistics support server 206, remote access server 208, data repository 210, data analysis server platform 218, lifecycle management server platform 220 to provide data warehousing, readiness assessment, lifecycle analysis, and distance support including logistics support, 24/7 chat, as well as remote access. As is known in the art, software programs typically require accreditation as part of configuration management objectives typically associated with computing networks. Accreditation processes may be used to evaluate and test developed software solutions to ensure the solutions will effectively measure up to certain baseline standards. In one embodiment, accreditation server 328 includes one or more software programs that may be used to assess the viability of software solutions developed by one or more users residing at console 330, 332 and accredit the developed solutions. Accreditation server 328 also acts as support server 202 and 204 to evaluate the legality of the information transfer of video, chat, data between network 304 and 306 by validating the user access credential at console 330, 332.

Figure 4:
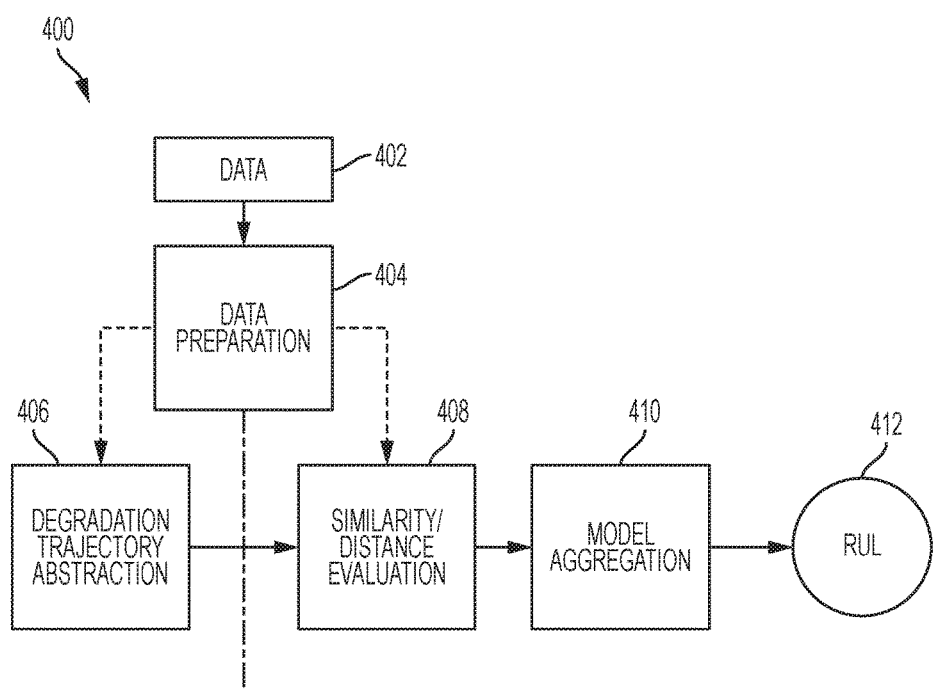
FIG. 4 is an exemplary diagram showing a process for measuring remaining useful life of an electronic system according to an embodiment of the present disclosure.

FIG. 4 is an exemplary diagram showing a process 400 for measuring remaining useful life of an electronic system according to an embodiment of the present disclosure. Process 400 begins at data block 402 indicating the plurality of sensor data that may be provided by the one or more internal sensors 108 discussed above. Process 400 then proceeds to data preparation block 404 in which, as discussed above, distance support server 318 may be used for data preparation which includes compiling and formatting the plurality of sensor data prior to data transfer from a first network to an exemplary external network (i.e., a second network). In one embodiment, block 404 may be used to separate sensor data based on the mode the system is operating in to filter data that is statistically unrelated to the objective the system is assigned to do. Process 400 then proceeds to one of block 406 and block 408. At block 406, process 400 includes data degradation trajectory and abstraction. As discussed above, degradation trajectory and abstraction may include prediction of impending system or device failures through a prognostic methodology that includes looking at system degrading trends and reliability metrics. At block 408, process 400 includes evaluation of the degrading trends and reliability metrics indicated by at least one sensor to determine if there are similarities with metrics/trend data provided by another sensor or from previous recorded data trend. At block 408, process 400 may further include evaluation of the trend data to predict a distance/length of time until exhaustion of remaining life of a particular device, component, or system element. Process 400 then proceeds to block 410 and executes an aggregation model that uses advanced data processing, data analytics, and/or detailed root cause analysis to ultimately predict the remaining useful life (RUL) 412 of the device, component, or system element.

Figure 5:
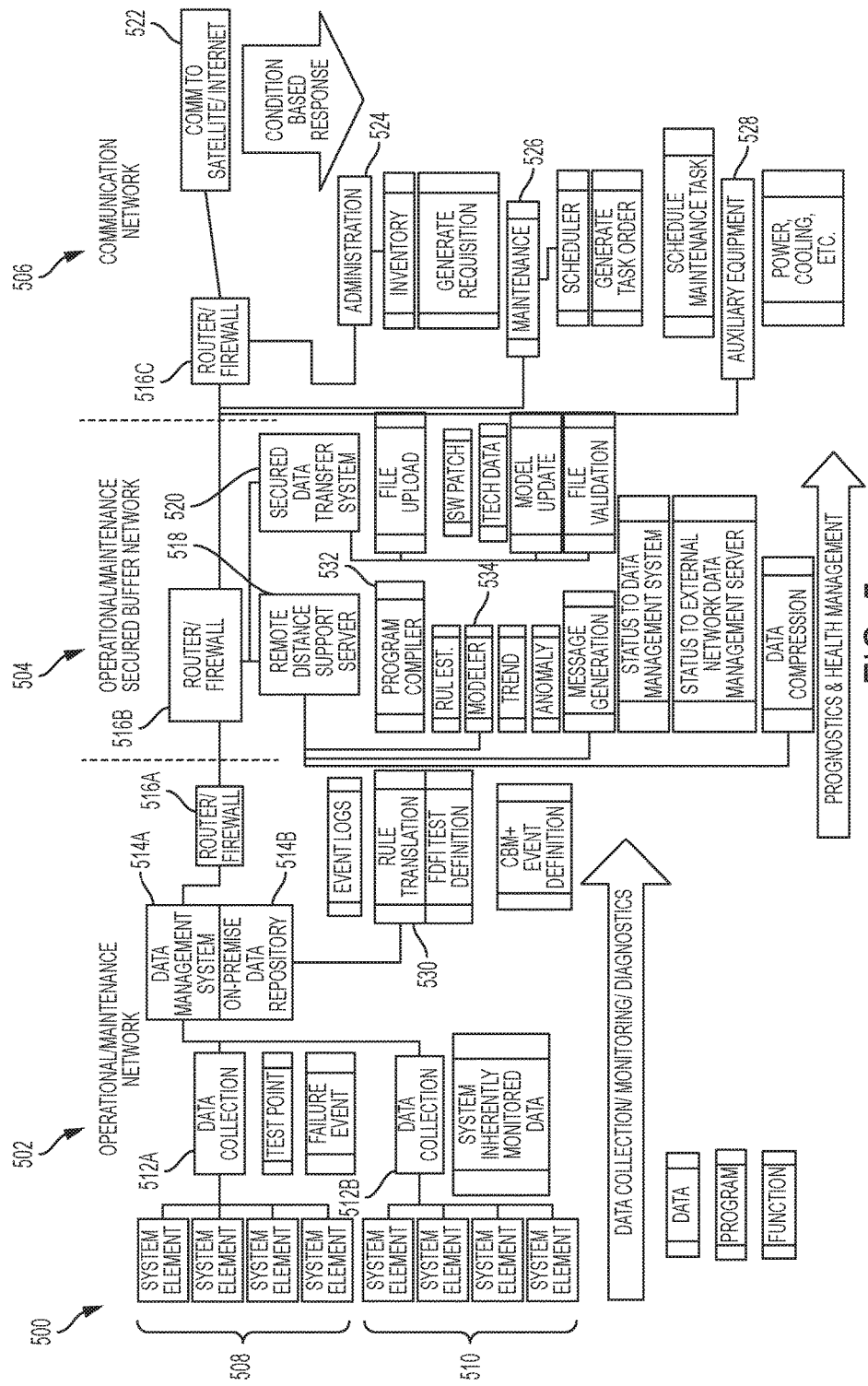
FIG. 5 is a block diagram depicting a first portion of an exemplary data collection and analysis computing network according to an embodiment of the present disclosure.

FIG. 5 is a block diagram depicting a first portion of an exemplary data collection and analysis computing network 500 according to an embodiment of the present disclosure. Data collection and analysis computing network 500 (hereinafter "network 500") generally includes a maintenance network 502, a buffer network 504, and a communication network 506. Maintenance network 502 generally includes a first plurality of system elements 508, a second plurality of system elements 510, a first data collector 512A, a second data collector 512B, a data management system 514A, an on-premise data repository 514B, a router/firewall 516A, and a rule translation device 530. In one embodiment, network 500 includes a network architecture that is substantially similar to network 100 and provides an alternative embodiment to network 100 that includes an exemplary data path and a plurality of data analytic capability. When disposed within a data processing facility or ship/vessel, network 500 provides sensor system capability that enables on-site personnel to examine failures associated with system components using quantitative analysis. Prior art network diagnostics system design often only alerts personnel on a pending issue and there is typically no data available to reflect on the issue. As discussed herein above, regarding prognostics health management, the present disclosure provides systems and methods for the identification of impending fault codes based on a series of sensory data illustrating a degradation trend. The present disclosure further includes application of quantitative analysis to such degradation trends to predict RUL and/or prescribe corrective maintenance actions.

First plurality of system elements 508 include various on-site computing systems that may be used within a data processing center, cruise ship or other vessel. For example, elements 508 may include radar and navigation computer systems or application server racks. In one embodiment, each element of the plurality of system elements 508 may have data monitoring circuit cards that are configured to monitor the performance of a server or shipboard computer system. In one aspect of this embodiment, one or more system elements 508 may include local rule-based fault detection logic that functions to alert personnel as to a current or prospective system failure. Second plurality of system elements 510 may be network cabinets that contain racks of electronics such as servers, routers, and firewall devices. Similar to system elements 508, the electronics devices of system elements 510 also include local rule-based fault detection logic including built-in self-test functionality designed to alert personnel as to a current or prospective system failure. Accordingly, in one embodiment, first and second plurality of system elements 508, 510 may each include computing servers having at least one circuit board with fault detection logic configured to detect one or more fault conditions associated with at least one system element of the plurality of system elements 508, 510. In one aspect of this embodiment, the fault conditions may be used to indicate one or more failure modes. In the present disclosure, devices that comprise elements 510 provide data through the Simple Network Management Protocol (SNMP) to the data management system 514A within network 500 for system level health assessment. Alternative embodiments of the present disclosure may include other internet protocols to transmit data from system element 510 to data management system 514A.

As shown in the illustrative embodiment of FIG. 5, in maintenance network 502, first data collector 512A is communicably coupled to first plurality of system elements 508 and is configured to receive data communications from each of the plurality of system elements 508 as well as transmit the data by way of the data buses connected to the monitoring circuit cards of system elements 508. Likewise, second data collector 512B is communicably coupled to second plurality of system elements 510 and is configured to receive data communications from each of the plurality of system elements 510 as well as transmit the data by way of the network ports of system elements 510 using SNMP. The first and second data collectors 512A/B provide data transfer functionality to transfer data from the system elements 508, 510 to data management system (DMS) 514A and a data repository 514B. In one embodiment, DMS 514A is communicably coupled to the first and second data collectors 512A/B and is configured to receive the data transmitted by data collectors 512A/B and store the data in data repository 514B. In one embodiment, data repository 514B is disposed within DMS 514A and is a conventional file directory used to store data awaiting to be extracted or transferred from maintenance network 502. In an alternative embodiment, the data repository 514B is a separate data warehousing hardware in a Raid configuration to provide data storage with redundancy for the maintenance network 502.

DMS 514A is configured to interpret and convert/format the collected data into structured failure information and present the information to a personnel/user by way a graphical user interface (GUI) such as a conventional computer display. DMS 514A also allows the users to execute test scripts to collect test point data and isolate any detected system faults/fault codes in order to identify the specific component of a system that is experiencing the fault condition. As described in more detail below, DMS 514A may be configured to allow users to compare current system data with predicted data from a predictive analysis software model (e.g., a model created using R Compiler, Matlab Compiler or related Modeler software program) to determine whether a failure will occur in the near-future. In one embodiment, data collector 512B collects and transfers (to DMS 514A) system inherently monitored data including system performance parameters such as, rack/server temperature, fan speed, voltage values, etc. as well as event changes or status changes of the electronic devices.

Rules translation device 530 is a software program used to establish an outcome in the rule-based fault detection logic as well as establish the fault isolation needed to tell an exemplary operations readiness test system what to display when a specific fault or predicted failure occurs from a specific system. For example, if a fault code is detected within an email server application or within a radar computer system, then an exemplary GUI/display will indicate the failure to a user. In one embodiment, the GUI indicates the failure by highlighting an exemplary system block on the user's display representing the radar computer and changes the block's color from green to red (red being indicative of device failure). In one embodiment, rules translation device 530 resides within DMS 514A and includes fault detection fault isolation (FDFI) logic used to establish the rule for fault detection and fault isolation. In one aspect of this embodiment, the FDFI logic is configured to detect changes in the collected data that may be considered a "current" fault in a particular equipment or device. Accordingly, DMS 514A may include logic configured to provide one or more fault detection protocols and one or more fault isolation protocols, wherein the FDFI logic cooperates with the logic of the at least one circuit board and causes DMS 514A to display, via a GUI, one or more fault conditions associated with at least one circuit board. In one aspect of this embodiment, the FDFI logic will identify the specific maintenance procedure and support material as a rule to resolve the fault conditions on the circuit board. In another embodiment, rules translation device 530, further includes condition based maintenance (CBM) logic (i.e., predictive maintenance logic) having event definitions used to establish rules for effective failure prediction. In one aspect of this embodiment, the CBM logic is configured to detect changes in the collected data that may reliably indicate the occurrence of a future/prospective system fault within a particular equipment or device. As is known in the art, router/firewall 516A may be a conventional device used to establish a separate network domain for maintenance network 502 relative to other sub-networks that comprise the larger network 500.

Buffer network 504 generally includes router/firewall 516B, distance support server 518, and secure transfer system 520. Distance support server 518 generally includes program compiler 532, modeler 534, message generator 536, and data compressor 538. Network 504 is a network domain used to filter data communications and network traffic coming in or going out of maintenance network 502. Accordingly, network 504 functions much like a data security check point for network 502 that protects the maintenance and operation network from one or more data/cybersecurity threats. Buffer network 504 may also serve as the proxy staging place for data to be moved between maintenance/operation network 502 from an exemplary outside/external network because network 504 has the ability to provide anti-virus screening and other cybersecurity functions. Stated another way, in one embodiment, network 504 is a secured buffer network configured to filter data received by maintenance network 502 and transmitted by network 504, wherein filtering the data includes removing malicious code from the data and removing code configured to cause undesired effects to either network 502 or network 504. Also in one embodiment, network 504 also provides high power computing capability with support server 518 being the data processing center to generate RUL estimation that may require significant computing resources and reduce the need for maintenance network 502 to provide its own computing sources.

In the illustrative embodiment of FIG. 5, a network 504 is communicably coupled to network 502 and has support server 518 and secure transfer system 520 providing secure data communications to an exemplary external network. Secure transfer system 520 receives data from the external network and monitors data communications transmitted from maintenance network 502 to buffer network 504 and from buffer network 504 to the exemplary external network. In one embodiment, network 500 is disposed in an exemplary ship or vessel. In this embodiment, distance support server 518 is used for communication between the shore/land-based support and maintenance network 502. Support server 518 allows a shore user to connect into buffer network 504 and read data about the plurality of system elements 508, 510 in network 502 and even remote connect to computing systems within network 502 through VPN (virtual private network) software. Secure transfer system 520 is used to monitor data and files being moved through networks 502 and 504 and includes data validation, anti-virus screening and other data/cybersecurity software functions.

In one embodiment, secure transfer system 520 includes a file upload program that uploads data from a shore/remote server device and filters the uploaded data through the cybersecurity software. Transfer system 520 further includes software patches that are uploaded to update software programs utilized within network 502 so as to protect the network against new cybersecurity threats as well as enhance equipment health. Transfer system 520 further includes updated technical data/documentation uploaded for the user. The updated technical documentation provides the latest information to the user about the new software patches as well as new information about maintaining systems operating within networks 502 and 504. Secure transfer system 520 may also include one or more model software updates specific for a particular system modeling program used for both prognostics health management and embedded diagnostics. The software updates are generally used to update certain configuration settings (e.g., parameter weight factors) for each model to, for example, change the sensitivity of the model in relation to the collected data without changing the actual function of the modeler.

Program compiler 532 may be a Matlab software module used to run Matlab data analytic functions. In alternative embodiments of the present disclosure, other software programs such as R, Java, or C++ may be used instead of, or in addition to, matlab. Compiler 532 includes remaining useful life (RUL) estimation logic that may be used to predict the remaining life of a device associated with systems elements 508, 510. The predicted RUL is based on the data collected from DMS 514A and the logic may be comprised of one or more algorithms used to perform predictive analysis or prognostics on sensor data associated with the performance of electronic devices. The RUL predictions may be used to provide future system health that is displayed on a user's GUI coupled to DMS 514A.

Modeler 534 is a software program used to construct a system behavior model. System behavior can be used for predicting a system's RUL or to see how the system is performing in real-time. Modeler 534 includes a trending function used to assess how well a system is performing in real-time by comparing current data to historic data collected from DMS 514A or trained data set received from the external network. Data produced from the regression analytic function may be used to provide the current system health back to DMS 514A for display to the user. Modeler 534 further includes anomaly detection logic used to assess whether a particular system (e.g., system elements 508, 510) is performing differently from the historic data collected from DMS 514A or trained data set received from the external network. Modeler 534 may also use the anomaly detection logic to classify a pattern separate from the established system behavior model and alert a user of an unknown system behavior through a GUI coupled to DMS 514A.

Message device 536 sends messages from network 504 to other networks. In one embodiment, message device 536 generates and sends one or more status messages to DMS 514A indicating the real-time system health, system behavior, future health, or an unknown system behavior of a particular device or system element operating within network 502. In one aspect of this embodiment, message device 536 generates a status message to an exemplary data management server of an external network. The message indicates the real-time system health, system behavior, future health, or an unknown system behavior of a particular device or system element operating within network 502. Data compressor 538 compresses collected data to be moved to a server of an external network. The compressed data may include both raw data from the system elements 508, 510 and/or the processed or modified data created by the compiler 532 and modeler 534. In an alternative embodiment, data compressor 538 reduces collected data by selectively filtering unused data before compressing the collected data to be moved to a server of an external network to further reduce data size.

Communication network 506 generally includes router/firewall 516C, SATCOM device 522, administration system 524, maintenance system 526, and auxiliary equipment 528. Communication network 506 serves as a network used to establish communication with an exemplary external network such as a remote data processing center or shore-side server. Network 506 may also provide one or more external application programs used by the processing center or shore-side device to support network maintenance activity occurring within network 500. In one embodiment, SATCOM device 522 is a system used to communicate with an orbiting satellite from a remote location (i.e., ship, offshore platform, etc.) to establish satellite communication (SATCOM) link that provides a network connection with an external network. As discussed above, router/firewall 516C may be a conventional device used to establish a separate network domain for communication network 506 relative to other sub-networks that comprise the larger network 500. In one embodiment, network 506 acts as a consolidation point for networks 502, 504 and an exemplary external network. In one aspect of this embodiment, an Information Technology (IT) specialist (e.g., a user/technician working in network 502) may use network 506 to establish/facilitate a data link or connection with an external network such as a shore-side server.

Administration system 524 includes a rack of servers/network resources used to facilitate completion of administration tasking within network 500. In one embodiment, system 524 includes a software program used to procure replacement devices/parts as well as manage an inventory of devices used within network 500. In one aspect of this embodiment, a part requisition is transmitted from network 502 through communication network 506 to an external network wherein a user (in network 500) may generate a procurement requisition to obtain a replacement device. Likewise, maintenance system 526 includes a rack of servers/network resources that cooperate to manage maintenance activities occurring within network 500. In one embodiment, maintenance system 526 includes a scheduler software program used to schedule maintenance task orders as well as generate a corresponding task order message that is recorded in a memory of system 526. The scheduler program may also be used to schedule maintenance tasks indicating a required preventive or corrective maintenance action within a network 500. In one aspect of this embodiment, a network user may monitor the maintenance schedule to ensure timely completion of required maintenance actions and alert a user, within proximity of the physical location of network 500 or from a remote location, to conduct maintenance on the specific system element 508, 510 in a timely basis.

Auxiliary equipment 528 includes an external network configured to manage an exemplary vessel/data center's power, cooling and mechanical equipment. Auxiliary equipment 528 may be comprised of a plurality of devices used to support and facilitate the operation of one or more electronic devices operating in networks 502 and 504. In one embodiment, network 506 collects performance data about the plurality of devices that comprise auxiliary equipment 528, wherein the collected data may be transmitted to an exemplary remote/shore-side external network for data analysis. The collected data includes, for example, power output metrics of individual devices in the plurality of devices and the effectiveness of cooling functions provided by one or more of the individual devices that may prevent the system elements 508, 510 from achieving their objectives.

Figure 6:
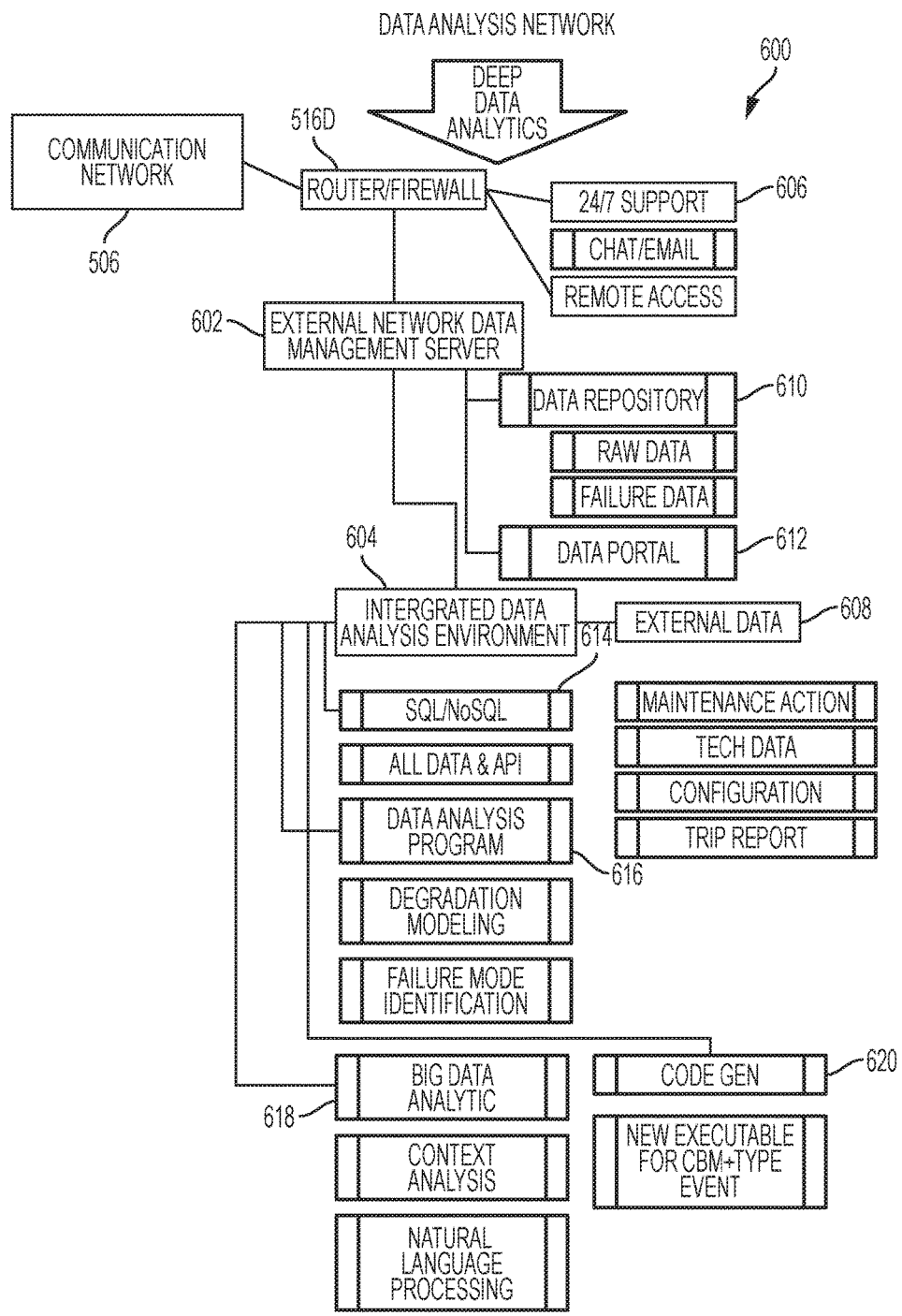
FIG. 6 is a block diagram depicting a second portion of an exemplary data collection and analysis computing network according to an embodiment of the present disclosure.

FIG. 6 is a block diagram depicting a second portion of an exemplary data collection and analysis computing network 600 according to an embodiment of the present disclosure. Data collection and analysis computing network 600 (hereinafter "external network 600") generally includes router/firewall 516D, external data management server 602 (hereinafter "external DMS 602"), integrated data environment 604, support function 606, external data interface 608, data repository 610, and data portal 612. As discussed above, router/firewall 516D may be a conventional device used to establish a network boundary between external network 600 and network 500. In one embodiment, external network 600 (i.e., an exemplary shore-side/remote data center network) is entirely separate from network 500 (i.e., an exemplary local vessel/local data center network). For any shore-side user who needs to connect to a vessel or remote data center network, the user will be accredited through a secured data zone within external network 600 before being allowed to establish a data connection or communications link with network 500 (i.e., ship/vessel network). Likewise, the same is true if a user within the ship's network needs to connect to a shore-side network. In one aspect of this embodiment, an IT specialist (e.g., a user/technician working in network 500) may use network 506 (on a vessel or remote location) to establish/facilitate a data link or connection with a shore-side server disposed in external network 600.

As indicated above, the present disclosure provides an improved data analysis framework. In various embodiments of the present disclosure, external network 600 includes a variety of server systems this framework will interact with from, for example, a shore-side data processing center relative to a local ship network. In alternative embodiments, external network 600 may contain plurality of network domains; however, for purposes of the present disclosure, network 600 comprises a single network domain. In one embodiment, external network 600 is a data analysis network that communicably couples to networks 502 and 504 by way of communication network 506, wherein the data analysis network is configured to retrieve data from network 504 through communication network 506. In one aspect of this embodiment, and as discussed in more detail below, the data analysis network includes DMS 602 that stores the retrieved data through the data repository 610 and provides a GUI for a user to access through the data portal 612. In one embodiment, data portal 612 is a program inside DMS 602, such as Microsoft SharePoint, that facilitates acquisition of data from DMS 602 by one or more users within network 600.

Integrated data environment (IDE) 604 generally includes query language program 614, data analysis program 616, big data analytic program 618, and code generator 620. IDE 604 is a system in which an advanced data analyst working within external network 600 can manage data retrieved from network 500 and further analyze the retrieved data for network maintenance purposes. Query language program 614 is a generalized database program configured to manage both structured query language (SQL) and non-structured query language (NO-SQL) queries relating to the retrieved data and other external data. In one embodiment, IDE 604 has access to all data retrieved from network 500 as well as data retrieved from external sources other than network 500. The retrieved data may be stored in data repository 610 such that IDE 604 can access and retrieve them into query language program 614 for a user to execute queries on the data. In one aspect of this embodiment, an application programming interface of program 614 is responsive to a set of instructions inputted by an accredited user so that the user can retrieve specific data sets stored within IDE 604.

Data analysis program 616 is a program (e.g., a Matlab program) utilized by a user and/or a system within external network to perform data analysis functions. In alternative embodiments, other programs could be used in IDE 604 to analyze the retrieved data. Data analysis program 616 may be configured to include degradation modeling logic having data analysis functions used to determine how fast a system performance (e.g., performance of system elements 508, 510) is degrading over-time and the degradation's effect on RUL of the system or a particular device used within the system. Stated another way, the degradation modeling logic provides a type of predictive maintenance function which aids in the overall data analysis functions of program 616. Data analysis program 616 may be further configured to include failure mode identification logic having data analysis functions used to determine what failure mode is a root-cause of a particular system failure. The aforementioned predictive maintenance capabilities of program 616 enable the failure mode identification function to further provide accurate estimation metrics based on reliable statistics derived from the degradation logic.

Big data analytic program 618 is a program used to analyze textural data retrieved from event logs, chat sessions, or other text-based data as well as large data sets from different sources with no established relationship. As is known in the art, external network 600 may include a support function such as a help desk through the support function 606 that monitors network operations 24 hours a day and 7 days a week. IT specialists and other users within external network 600 may use a chat/instant message and/or email client to exchange text messages, text-based communications and various other types of data communications with other users within network 600 as well as with users in network 500. In one embodiment, communications exchanged between, for example, ship/vessel users and shore-side/remote user will be collected and stored within shore-side servers (e.g., external network 600) for data analysis. In one embodiment, analytic program 618 includes context analysis functions used to analyze text-data exchanged between users during chat sessions and email communications. Analysis of the text-data may be used to establish trends and behaviors indicative of a prospective device failure, effective corrective action to remedy a device failure, or required maintenance of a particular system or device within network 500. In one embodiment, data analysis program 616 cooperates with big data analytic program 618 to provide failure identification modeling that analyzes a plurality of data to one of: 1) predict the occurrence of a system failure; and 2) determine a maintenance action sufficient to mitigate the occurrence of the system failure. In one aspect of this embodiment, the plurality of data may include textual data associated with one of: 1) email communications; and 2) chat session communications. Analytic program 618 further includes natural language processing functions that overlay text data with failure data to provide a comprehensive sentiment about how device failures occur.

Big data analytic program 618 may be configured to establish relationships between words, phases, and characters into semantics through a user's knowledge as well as machine learning clustering technique such as artificial neural network. The aforementioned natural language processing capabilities of program 618 enable a user to further understand the behavior and failure of system elements 508, 510 beyond the sensor data and health status data collected and analyzed in network 500. Big data analytic 618 may also be configured to generate relationship between disparate data sources, such as analyzing the impact of the failures and degraded performance across a fleet of vessels or locations on textural responses and sentiments of the customers from social media collected by external source interface 608 to derive the future growth model on the number of vessels or locations to be used for a plurality of objectives.

Code generator 620 is a program used to update compiler 532. As discussed above, compiler 532 includes remaining useful life (RUL) estimation logic that may be used to predict the remaining life of a device associated with systems elements 508, 510. The predicted RUL is based on the data collected from DMS 514A and the logic may be comprised of one or more algorithms used to perform predictive analysis or prognostics on sensor data associated with the performance of electronic devices. Accordingly, code generator 620 may push updates to compiler 532 in order to execute new predictive maintenance algorithms to better identify required network maintenance to be performed on electronic devices operating within network 500. In one embodiment, code generator 620 provides new executable programs having new or improved CBM logic including functions to establish new predictive maintenance tasks in response sensor data collected by DMS 514A. External data 608 is any data not retrieved from a system/sensor of network 500 but rather is collected, either through a user within network 500, or is developed by a user within network 600. External data 608 is generally referenced and used for assistance in the analysis of system/sensor data retrieved from network 500. For example, external data 608 includes data such as: maintenance data (e.g., maintenance action done by a ship user and part requisition data recorded by the ship user); technical data/documentation; configuration management data (e.g., parts list for all ship systems); and text-based trip reports (e.g., data collected by shore user who visited the ship). In an alternative embodiment, code generator 620 may be configured to deploy software fault fixes or batches on the network 500 to provide solutions on failures that have occurred due to an internal design or software issue.

Figure 7:
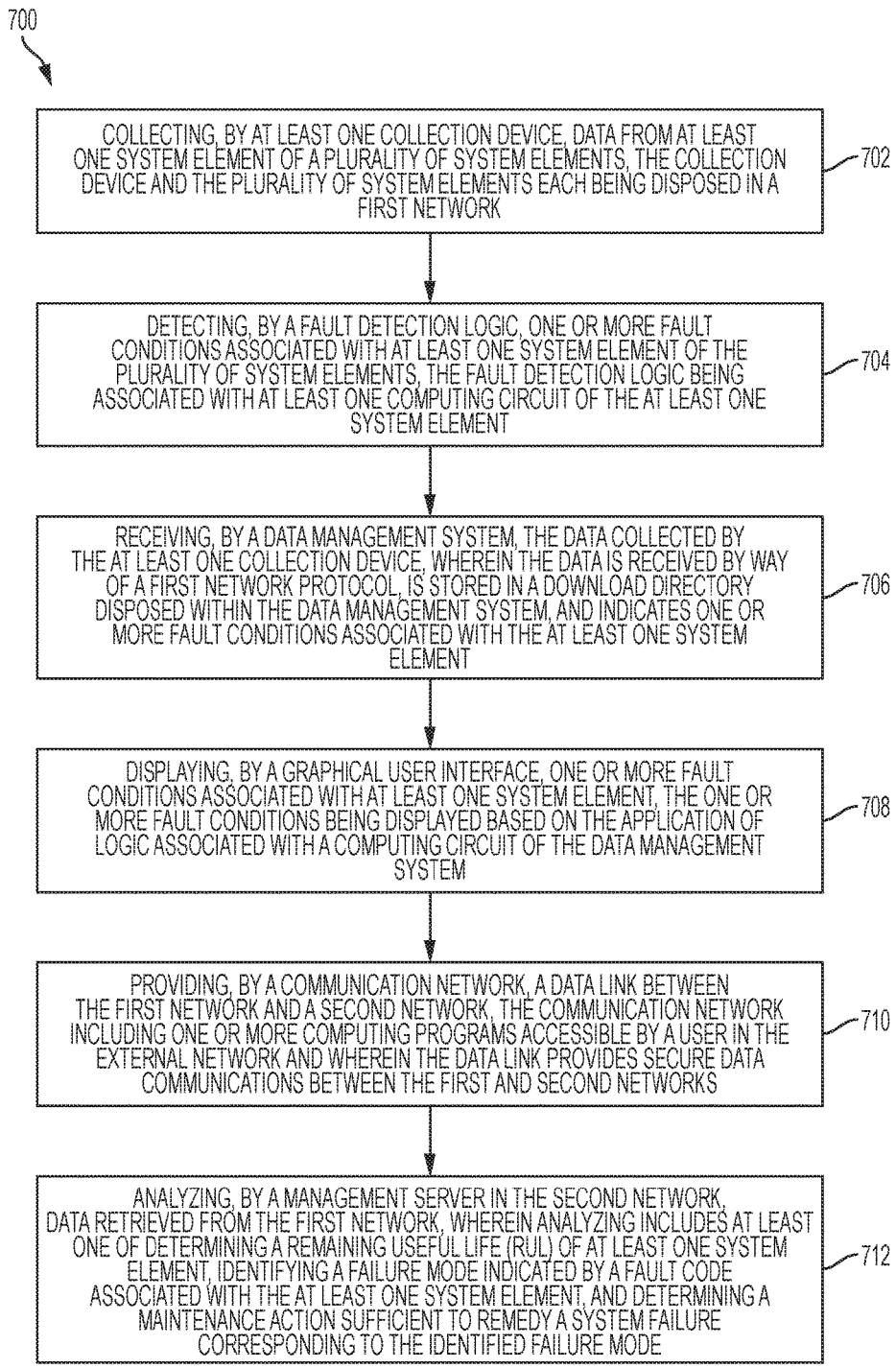
FIG. 7 is a flow diagram of an exemplary method for data collection and analysis according to an embodiment of the present disclosure.

FIG. 7 is a flow diagram of an exemplary method 700 for data collection and analysis according to an embodiment of the present disclosure. In various embodiments of the present disclosure, method 700 may be implemented and/or executed in an exemplary data collection and analysis computing network such as network 500 and network 600. As such, a description of method 700 may reference the aforementioned components and sub-systems of networks 500, 600. Method 700 begins at decision block 702 and includes collecting, by at least one collection device (data collector 512A/B), data from at least one system element of a plurality of system elements 508, 510, the collection device and the plurality of system elements each being disposed in a first network (network 500). At block 704, method 700 includes detecting, by a fault detection logic, one or more fault conditions associated with at least one system element of the plurality of system elements 508, 510, the fault detection logic being associated with at least one computing circuit of the at least one system element. In an alternative embodiment, block 704 may also include, detecting, by a predictive analysis logic stored in DMS 514A as determined by the modeler 534 and the compiler 534, one or more fault conditions to be predicted to be realized in an estimated RUL value associated with at least one system element of the plurality of system elements 508, 510, the fault detection logic being associated with at least one computing circuit of the at least one system element. At block 706, method 700 includes receiving, by a data management system (DMS 514A), the data collected by the at least one collection device, wherein the data is received by way of a first network protocol (e.g., SNMP), is stored in a download directory disposed within the data management system, and indicates one or more fault conditions associated with the at least one system element.

Method 700 then advances to block 708 and includes displaying, by a graphical user interface (GUI), one or more fault conditions associated with at least one system element, the one or more fault conditions being displayed based on the application of logic associated with a computing circuit of the data management system. In an alternative embodiment, block 708 may also include alerting a user in the proximity of faulted elements 508, 510 to view the information GUI and conduct immediate mediation of issues by scheduling maintenance using maintenance system 526 or generating requisition in administrative system 524. At block 710, method 700 includes providing, by a communication network (network 506), a data link between the first network (network 502, 504) and a second network (network 600), the communication network including one or more computing programs accessible by a user in the external network and wherein the data link provides secure data communications between the first and second networks. At block 712, method 700 includes analyzing, by a management server in the second network (external DMS 602), data retrieved from the first network, wherein analyzing includes at least one of determining a remaining useful life (RUL) of at least one system element, identifying a failure mode indicated by a fault code associated with the at least one system element, and determining a maintenance action sufficient to remedy a system failure corresponding to the identified failure mode.

In an alternative embodiment, block 712 may also include providing a user in the external network access to remote connect into network 500 to work with the user in the proximity of faulted elements 508, 510 for further troubleshooting. Block 712 may also include providing the user in the external network ability to evaluate the ongoing fault conditions to determine if the issue is pertaining to only the specific system representing network 500 or is impacting across a plurality of systems resembling network 500 in various locations. Block 712 may additionally include analyzing the relationship between the ongoing fault conditions with external data received from the external data interface 608 to determine if there is undiscovered correlation using the integrated data environment 604 and big data analytic program 618.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A system for data collection and analysis, comprising:
a first network having a first plurality of system elements and a second plurality of system elements;
a first collection device comprising a first non-transitory data storage medium comprising a first plurality of machine instructions, the first collection device is communicably coupled to the first plurality of system elements, wherein the first plurality of machine instructions is configured to operate the first collection device to receive first system element data communications from each of the first plurality of system elements and transmit the data by way of a first network protocol;
a second collection device comprising a second non-transitory data storage medium comprising a second plurality of machine instructions, wherein the second collection device is communicably coupled to the second plurality of system elements, the second plurality of machine instructions is configured to operate the second collection device to receive second system element data communications from each of the second plurality of system elements and transmit the data by way of the first network protocol;
a data management system comprising at least a third non-transitory data storage medium comprising at least a third plurality of machine instructions, wherein the data management system is communicably coupled to the first and second collection devices and configured to receive the first and second data communications transmitted by the first and second collection devices and store the first and second data communications in a data management system data storage medium section comprising a download directory disposed within the data management system;
wherein the second network is communicably coupled to the first network, the second network comprises a support server providing secure data communications to an external network and a secure transfer system that receives external data communications from the external network and monitors at least said first and second data communications transmitted from the first network to the second network and at least said external data communications from the second network to the external network;
a communication network communicably coupled to the second network and providing a communications link between the second network and the external network, the communication network including at least one communication network non-transitory data storage medium storing one or more computing programs accessible by a user interface system in the external network; and
a data analysis network communicably coupled to the second network by way of the communication network, wherein the data analysis network is the external network and is configured to retrieve at least said first system element data communications data from the second network through the communication network;
wherein the data analysis network includes a management server that stores the retrieved data on a data analysis network non-transitory data storage medium, the management server including machine instruction or control logic configured to execute steps comprising at least one of analyze the retrieved data and determine remaining useful life (RUL) of at least one system element, identify a failure mode associated with the at least one system element, and determine a maintenance action sufficient to remedy a system failure corresponding to the identified failure mode.

2. The system of claim 1, wherein the logic includes degradation modeling that assesses the rate at which performance of the at least one system element degrades over a pre-determined time period and determines the remaining RUL based on an assessed rate of performance degradation.

3. The system of claim 2, wherein the logic further includes failure identification modeling that analyzes a plurality of data to one of predict the occurrence of a system failure and determine a maintenance action sufficient to mitigate the occurrence of the system failure, and wherein the plurality of data includes textual data associated with one of email communications and chat session communications.

4. The system of claim 1, wherein the first and second networks are system maintenance networks configured to provide data communications indicating one or more fault conditions associated with the first and second plurality of system elements, the fault conditions being used to indicate one or more failure modes.

5. The system of claim 4, wherein the second network is a secured buffer network configured to filter data received by the second network and transmitted by the second network, wherein filtering the data includes removing malicious code from the data and removing code configured to cause undesired effects to the first network.

6. The system of claim 1, wherein the first and second plurality of system elements each include computing servers having at least one circuit board, the at least one circuit board including fault detection logic configured to detect one or more fault conditions associated with at least one system element of the plurality of system elements, the fault conditions being used to indicate one or more failure modes.

7. The system of claim 6, wherein the data management system includes logic providing one or more fault detection protocols and one or more fault isolation protocols, wherein the logic cooperates with the fault detection logic of the at least one circuit board and causes the data management system to display, via a GUI, one or more fault conditions associated with at least one circuit board.

8. The system of claim 1, wherein the first protocol is a simple network management protocol (SNMP) and the data analysis network is configured to receive data from the second network through the support server, and wherein the data is received by way of a secure virtual private network (VPN) connection.

9. A system for data collection and analysis, comprising:
an operations maintenance network having a first plurality of system elements and a second plurality of system elements;
a data management system, comprising at least a first non-transitory data storage medium comprising at least a first plurality of machine instructions, disposed in the operations maintenance network and communicably coupled to the first and second plurality of system elements and at least one collection device, the data management system being configured to receive data communications from each of the first plurality of system elements and each of the second plurality of system elements, wherein the data communications are received by way of the at least one collection device, wherein each of the at least one collection devices comprises a non-transitory data storage medium comprising a plurality of machine instructions;
a communication network communicably coupled to the operations maintenance network and providing a communications link between the operations maintenance network and an external network, the communication network including at least one communication network non-transitory data storage medium storing one or more computing programs accessible by a user interface system in the external network;
a support server disposed in the operations maintenance network and communicably coupled to the data management system, the support server providing secure data communications to the external network;
a secure transfer system disposed in the operations maintenance network and communicably coupled to the support server; the secure transfer system being configured to receive data from the external network and to monitor data communications transmitted from the operations maintenance network to the external network; and
a data analysis network communicably coupled to the operations maintenance network by way of the communication network, wherein the data analysis network is the external network and is configured to retrieve at least said first system element data communications data from the operations maintenance network through the communication network;
wherein the data analysis network includes a management server that stores the retrieved data on a data analysis network non-transitory data storage medium and machine instruction or control logic configured to execute steps comprising at least one of analyze the retrieved data and determine remaining useful life (RUL) of at least one system element, identify a failure mode associated with the at least one system element, and determine a maintenance action sufficient to remedy a system failure corresponding to the identified failure mode.

10. The system of claim 9, wherein the logic includes degradation modeling that assesses the rate at which performance of the at least one system element degrades over a pre-determined time period and determines the remaining RUL based on an assessed rate of performance degradation.

11. The system of claim 10, wherein the logic further includes failure identification modeling that analyzes a plurality of data to one of predict the occurrence of a system failure and determine a maintenance action sufficient to mitigate the occurrence of the system failure, and wherein the plurality of data includes textual data associated with one of email communications and chat session communications.

12. The system of claim 9, wherein the first and second plurality of system elements each include computing servers having at least one circuit board, the at least one circuit board including fault detection logic configured to detect one or more fault conditions associated with at least one system element of the plurality of system elements.

13. The system of claim 12, wherein the data management system includes logic providing one or more fault detection protocols and one or more fault isolation protocols, wherein the logic cooperates with the fault detection logic of the at least one circuit board and causes the data management system to display, via a GUI, one or more fault conditions associated with at least one circuit board.

14. The system of claim 9, wherein the operations maintenance network includes a secure butler sub-network configured to filter data received by the operations maintenance network and transmitted by the operations maintenance network, wherein filtering the data includes removing malicious code from the data and removing code configured to cause undesired effects to the operations maintenance network.

15. The system of claim 9, wherein the at least one collection device receives data from each of the first plurality of system elements and each of the second plurality of system elements and transmits the data to the data management system by a simple network management protocol (SNMP).

16. A method in a system for data collection and analysis, comprising:
collecting, by at least one collection device each comprising a non-transitory data storage medium comprising a plurality of machine instructions, data from at least one system element of a plurality of system elements, the collection device and the plurality of system elements each being disposed in a first network;
detecting, by a fault detection logic, one or more fault conditions associated with at least one system element of the plurality of system elements, the fault detection logic being associated with at least one computing circuit of the at least one system element;
receiving, by a data management system comprising at least a second non-transitory data storage medium comprising at least a second plurality of machine instructions, the data collected by the at least one collection device, wherein the data is received by way of a first network protocol, is stored in a download directory disposed within the data management system, and indicates one or more fault conditions associated with the at least one system element;
displaying, by a graphical user interface, one or more fault conditions associated with at least one system element, the one or more fault conditions being displayed based on the application of logic associated with a computing circuit of the data management system, the logic including one or more fault detection protocols and one or more fault isolation protocols that cooperate to isolate a fault condition to a particular system element;

providing, by a communication network, a data link between the first network and a second network, the communication network at least one communication network non-transitory data storage medium storing including one or more computing programs accessible by a user interface system in the external network and wherein the data link provides secure data communications between the first and second networks;

analyzing, by a management server disposed in the second network, data retrieved from the first network through the communication network, wherein the management server stores the retrieved data on a data analysis network non-transitory data storage medium and applies logic to execute steps comprising analyzing the retrieved data, and wherein analyzing the retrieved data includes at least one of determining a remaining useful life (RUL) of at least one system element, identifying a failure mode indicated by a fault code associated with the at least one system element, and determining a maintenance action sufficient to remedy a system failure corresponding to the identified failure mode.

17. The system of claim 16, wherein the logic includes degradation modeling that assesses the rate at which performance of the at least one system element degrades over a pre-determined time period and, wherein analyzing the retrieved data includes determining the remaining RUL based on an assessed rate of performance degradation.

18. The system of claim 17, wherein the logic further includes failure identification modeling that analyzes a plurality of data to one of predict the occurrence of a system failure and determine a maintenance action sufficient to mitigate the occurrence of the system failure, and wherein the plurality of data includes textual data associated with one of email communications and chat session communications.

19. The system of claim 16, wherein the first network includes a secure buffer sub-network configured to filter data received by the first network and transmitted by the first network, wherein filtering the data includes removing malicious code from the data and removing code configured to cause undesired effects to the first network.

20. The system of claim 16, further including, comparing, based on trend data, a first data set collected at a first time period to a second data set collected at a second time period, and determining, based on the comparing step, a real-time performance parameter associated with at least one system element, the performance parameter indicating the health of the at least one system element, the second time period being later than the first time period, and the trend data being collected by the collection device.

21. A system for data collection and analysis, comprising:
a first network having a first plurality of system elements and a second plurality of system elements;
a first collection device comprising a first non-transitory data storage medium comprising a first plurality of machine instructions, the first collection device is communicably coupled to the first plurality of system elements, wherein the first plurality of machine instructions is configured to operate the first collection device to receive first system element data communications from each of the first plurality of system elements and transmit the data by way of a first network protocol;
a second collection device comprising a second non-transitory data storage medium comprising a second plurality of machine instructions, wherein the second collection device is communicably coupled to the second plurality of system elements, the second plurality of machine instructions is configured to operate the second collection device to receive second system element data communications from each of the second plurality of system elements and transmit the data by way of a second network protocol;
a data management system comprising at least a third non-transitory data storage medium comprising at least a third plurality of machine instructions, wherein the data management system is communicably coupled to the first and second collection devices and configured to receive the first and second data communications transmitted by the first and second collection devices and store the first and second data communications in a data management system data storage medium section comprising a download directory disposed within the data management system;
wherein the a second network is communicably coupled to the first network, the second network comprises a support server providing secure data communications to an external network and a secure transfer system that receives external data communications from the external network and monitors at least said first and second data communications transmitted from the first network to the second network and at least said external data communications from the second network to the external network;
a communication network communicably coupled to the second network and providing a communications link between the second network and the external network, the communication network including at least one communication network non-transitory data storage medium storing one or more computing programs accessible by a user interface system in the external network;
wherein the support server stores the retrieved data and includes logic configured to at least one of:
analyze the retrieved data, determine remaining useful life (RUL), determine a performance degradation pattern of at least one system element, identify a failure mode associated with the at least one system element, evaluate a plurality of impacts of the failure mode to a plurality of objectives of the first plurality of system elements and second plurality of system elements, and determine a maintenance action sufficient to remedy a system failure corresponding to the identified failure mode; and
a data analysis network communicably coupled to the second network by way of the communication network, wherein the data analysis network is the external network and is configured to retrieve at least said first system element data communications data from the second network through the communication network;
wherein the data analysis network includes a management server having machine instructions or control logic configured to execute steps comprising at least one of: store data generated from the first network, the second network, and the communication network, and to service a data portal for a plurality of users to enable at least one user of the plurality of users to gain access to the data generated from the first network, the second network, and the communication network;

the data analysis network further including an integrated data environment having instructions or control logic configured to at least one of:

load a plurality of data generated from the first, second, and communication networks into a database used to manage a plurality of structured data sets and a plurality of unstructured data sets, retrieve a plurality of external data from a plurality of external data sources, analyze the retrieved data, determine remaining useful life (RUL) and performance degradation pattern of at least one system element, identify a failure mode associated with the at least one system element, evaluate a plurality of impacts of the failure mode to a plurality of objectives of the first plurality of system elements and the second plurality of system elements, determine a maintenance action sufficient to remedy a system failure corresponding to the identified failure mode, correlate the plurality of data generated from the first, second, and communication network, process a plurality of text-based data using natural language processing, and generate machine readable instructions to modify an operational state of a plurality of systems disposed within the first network and the second network.

22. The system of claim 21, wherein the logic includes degradation modeling that assesses the rate at which performance of the at least one system element degrades over a pre-determined time period and determines the remaining RUL based on an assessed rate of performance degradation.

23. The system of claim 22, wherein the logic further includes failure identification modeling that analyzes a plurality of data to one of predict the occurrence of a system failure and evaluate a plurality of impacts of the failure mode to a plurality of objectives of the first plurality of system elements and the second plurality of system elements.

24. The system of claim 23, wherein the logic of the management server is further configured to determine a maintenance action sufficient to mitigate the occurrence of a system failure and mitigate the plurality of impacts of the system failure to the plurality of objectives of the first plurality of system elements and second plurality of system elements, and wherein the plurality of data includes textual data associated with one of email communications and chat session communications.

25. The system of claim 21, wherein the first and second networks are system maintenance networks configured to provide data communications indicating one or more fault conditions associated with the first and second plurality of system elements, the fault conditions being used to indicate one or more failure modes.

26. The system of claim 25, wherein the second network is a secured buffer network configured to filter data received by the second network and transmitted by the second network, wherein filtering the data includes removing malicious code from the data and removing code configured to cause undesired effects to the first network.

27. The system of claim 26, wherein the second network is further configured to alert the management server and the data analysis network using the information regarding RUL and health status of the plurality of objectives of the first plurality of system elements and second plurality of system elements.

28. The system of claim 26, wherein the data management system includes logic providing one or more fault detection protocols and one or more fault isolation protocols, wherein the logic cooperates with the fault detection logic of the at least one circuit board and causes the data management system to display, via a GUI, one or more fault conditions associated with at least one circuit board.

29. The system of claim 27, wherein the second network is further configured to at least one of compress and reduce a data size of data in the download directory and data generated by a machine readable instruction that calculates RUL and modeling trend and anomaly for the first plurality of system elements and the second plurality of system elements before providing data to the data analysis network.

30. The system of claim 29, wherein the communication network is coupled to a plurality of auxiliary equipment that support operation of the first plurality of system elements and the second plurality of system elements and that send data communications regarding an operational status of the plurality of auxiliary equipment to the second network by way of the communication network and to the support server to supplement information including power and cooling into the machine readable instructions that calculate RUL and modeling trend and anomaly for the first plurality of system elements and second plurality of system elements.

31. The system of claim 30, wherein the communication network is configured to extract information from the support server in the second network to generate a requisition request to replace at least one component of a plurality of components disposed within the first plurality of system elements and the second plurality of system elements that are predicted to fail in accordance to RUL and to generate a plurality of task orders to schedule maintenance actions to mitigate the failure of the first plurality of system elements and the second plurality of system elements.

32. The system of claim 21, wherein the first and second plurality of system elements each include computing servers having at least one circuit board, the at least one circuit board including fault detection logic configured to detect one or more fault conditions associated with at least one system element of the plurality of system elements, the fault conditions being used to indicate one or more failure modes.

33. The system of claim 21, wherein the first protocol and the second protocol is at least one of a simple network management protocol (SNMP), an IEEE 802.15.4 communication protocol, an IEEE 802.11 communication protocol, a Bluetooth communication protocol, a Secure File Transfer Protocol (SFTP), a Simple Network Management Protocol (SNMP), and a Secure Hyper Text Transfer Protocol (HTTPS).

34. The system of claim 21, wherein the data analysis network is configured to connect to a plurality of external data sources to correlate data received from the management server.

* * * * *